US012561401B2

(12) United States Patent
Takahira et al.

(10) Patent No.: US 12,561,401 B2
(45) Date of Patent: Feb. 24, 2026

(54) INFORMATION PROCESSING DEVICE, INPUT CONTROL METHOD AND PROGRAM

(71) Applicant: Hitachi, Ltd., Tokyo (JP)

(72) Inventors: Hiroyuki Takahira, Tokyo (JP); Yuji Kimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 694 days.

(21) Appl. No.: 17/974,857

(22) Filed: Oct. 27, 2022

(65) Prior Publication Data

US 2023/0205846 A1 Jun. 29, 2023

(30) Foreign Application Priority Data

Dec. 28, 2021 (JP) ................................. 2021-215089

(51) Int. Cl.
*G06F 18/21* (2023.01)
*G06F 18/2113* (2023.01)

(52) U.S. Cl.
CPC ...... *G06F 18/2178* (2023.01); *G06F 18/2113* (2023.01)

(58) Field of Classification Search
CPC .. G06F 18/2178; G06F 12/21; G06F 18/2113; G06F 18/21; G06F 18/217; G06F 18/211; G06F 18/2321; G06F 18/2413; G06F 18/2415; G06F 18/00
See application file for complete search history.

(56) References Cited

U.S. PATENT DOCUMENTS

| | | | | |
|---|---|---|---|---|
| 11,366,842 B1 * | 6/2022 | Swaminathan | ..... | G06F 16/2477 |
| 2006/0010164 A1 * | 1/2006 | Netz | ...................... | G06Q 10/06 |
| 2016/0381580 A1 * | 12/2016 | Kwan | ................... | H04W 24/08 |
| | | | | 370/252 |
| 2017/0364819 A1 * | 12/2017 | Yang | ...................... | H04L 41/16 |

(Continued)

FOREIGN PATENT DOCUMENTS

| | | | | |
|---|---|---|---|---|
| EP | 4203488 A1 * | 6/2023 | ......... | H04N 21/6547 |
| JP | 3-108612 A | 5/1991 | | |

(Continued)

OTHER PUBLICATIONS

L. F. C. Rojas and C. M. Z. Jaramillo, "Executable pre-conceptual schemas for representing key performance indicators," 2013 8th Computing Colombian Conference (8CCC), Armenia, Colombia, 2013, pp. 1-6.*

H. Xu*, Z. Wang, H. Yang, D. Liu, Ji Liu, "Learning Simple Thresholded Features with Sparse Support Recovery" Zhangyang Wang*, Member, IEEE, Haichuan Yang, Ding Liu, Member, IEEE, and Ji Liu, IEEE, Computer Science, Computer Vision and Pattern Recognition, 2019.*

(Continued)

*Primary Examiner* — Pierre Michel Bataille
(74) *Attorney, Agent, or Firm* — MATTINGLY & MALUR, PC

(57) ABSTRACT

The invention provides a method which can contribute to an improvement in KPIs even in the entire time series range through an input stage to an AI engine and its output stage. As a preferred embodiment of the invention, an information processing device using an AI engine is provided, which includes an arithmetic section and a storage section. In the information processing device, the arithmetic section executes an important KPI reception unit which receives important KPI information designated by a user, and a variable selection unit which selects an input variable input to the AI engine, on the basis of the important KPI information.

10 Claims, 20 Drawing Sheets

(56) References Cited

U.S. PATENT DOCUMENTS

| | | | | |
|---|---|---|---|---|
| 2019/0236556 A1 | | 8/2019 | Morisawa et al. | |
| 2020/0019822 A1* | | 1/2020 | Kothandaraman | G06Q 10/067 |
| 2020/0065208 A1* | | 2/2020 | Vijendra | G06F 11/3447 |
| 2020/0074236 A1* | | 3/2020 | Mase | G06F 18/217 |
| 2021/0191384 A1* | | 6/2021 | Trenchard | G06N 3/044 |
| 2021/0351973 A1* | | 11/2021 | Ford | H04L 43/067 |
| 2023/0152756 A1* | | 5/2023 | Gao | G06N 5/022 |
| | | | | 700/32 |

FOREIGN PATENT DOCUMENTS

| | | | | |
|---|---|---|---|---|
| JP | 10-124477 | A | 5/1998 | |
| JP | 2019-133412 | A | 8/2019 | |
| JP | 2020-30500 | A | 2/2020 | |
| WO | WO-2020242275 A1 * | | 12/2020 | G06N 3/044 |
| WO | WO-2021215720 A1 * | | 10/2021 | H04L 41/0631 |

OTHER PUBLICATIONS

A. Calabró, F. Lonetti and E. Marchetti, "Monitoring of Business Process Execution Based on Performance Indicators," 2015 41st Euromicro Conference on Software Engineering and Advanced Applications, Madeira, Portugal, 2015, pp. 255-258.*

D. Mulvey, C. H. Foh, M. A. Imran and R. Tafazolli, "Cell Fault Management Using Machine Learning Techniques," in IEEE Access, vol. 7, pp. 124514-124539, 2019.*

M. A. Tahir, M. Mahmoodpour and A. Lobov, "KPI-ML based integration of industrial information systems," 2019 IEEE 17th International Conference on Industrial Informatics (INDIN), Helsinki, Finland, 2019, pp. 93-99.*

Japanese Office Action received in corresponding Japanese Application No. 2021-215089 dated Dec. 3, 2024.

* cited by examiner

Figure 4:
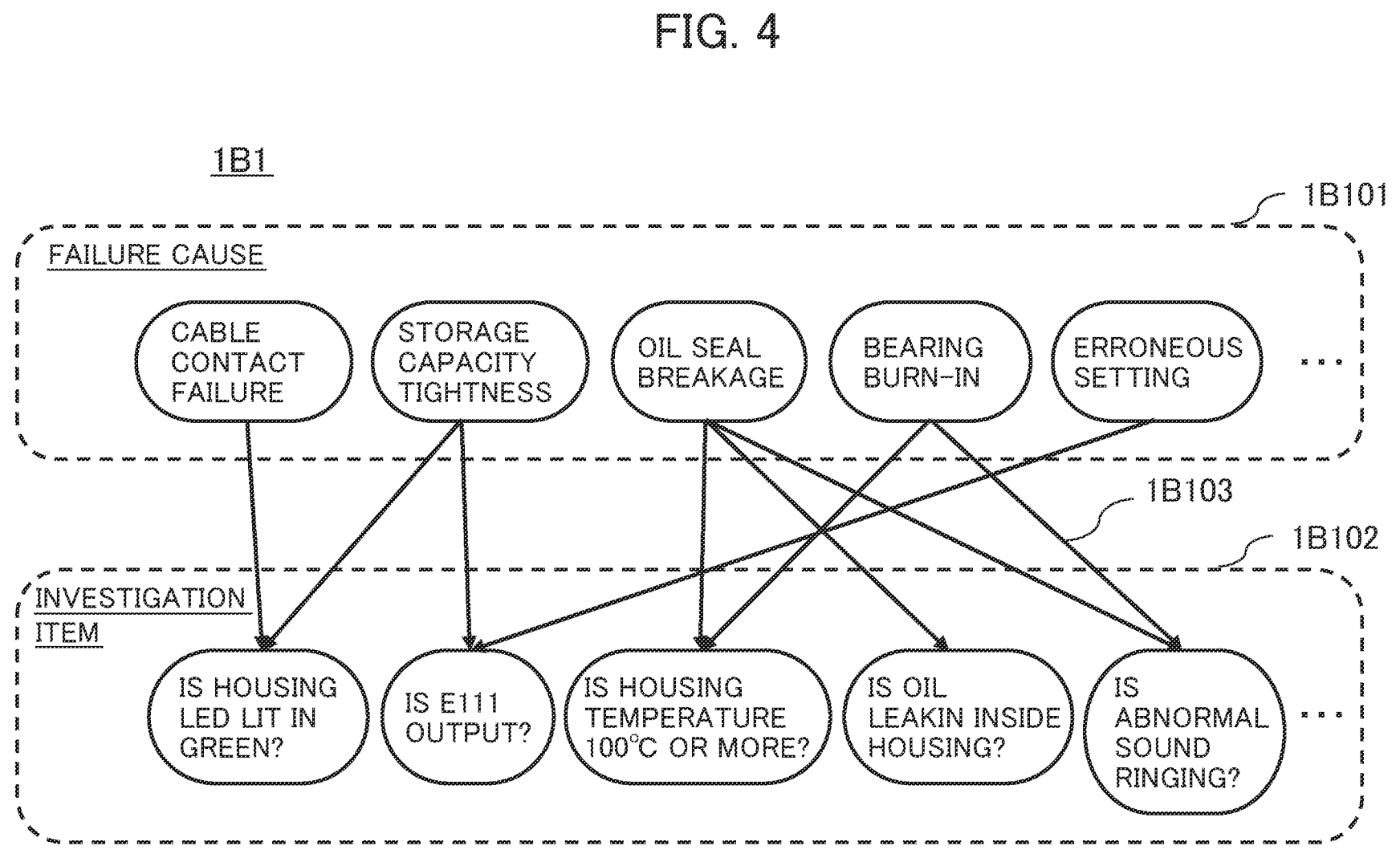

FAILURE CAUSE

CABLE CONTACT FAILURE

STORAGE CAPACITY TIGHTNESS

OIL SEAL BREAKAGE

BEARING BURN-IN

ERRONEOUS SETTING

1B103

1B102

INVESTIGATION ITEM

IS HOUSING LED LIT IN GREEN?

IS E111 OUTPUT?

IS HOUSING TEMPERATURE 100°C OR MORE?

IS OIL LEAKIN INSIDE HOUSING?

IS ABNORMAL SOUND RINGING?

| NAME OF FAILURE CAUSE | NAME OF REPAIR METHOD |
|---|---|
| CABLE CONTACT FAILURE | PLUGGING/UNPLUGGING OF CABLE |
| STORAGE CAPACITY TIGHTNESS | DELETION OF LOG |
| OIL SEAL BREAKAGE | REPLACEMENT OF OIL SEAL |
| BEARING BURN-IN | ADD LUBRICATING OIL |
| ERRONEOUS SETTING | RESETTING |
| ... | ... |

| NAME OF INVESTIGATION ITEM |
|---|
| IS HOUSING LED LIT IN GREEN? |
| IS E111 OUTPUT? |
| IS HOUSING TEMPERATURE 100°C OR MORE? |
| IS OIL LEAKING INSIDE HOUSING? |
| IS ABNORMAL SOUND RINGING? |
| ... |

| NAME OF FAILURE CAUSE | NAME OF INVESTIGATION ITEM |
|---|---|
| CABLE CONTACT FAILURE | IS HOUSING LED LIT IN GREEN? |
| STORAGE CAPACITY TIGHTNESS | IS HOUSING LED LIT IN GREEN? |
| STORAGE CAPACITY TIGHTNESS | IS E111 OUTPUT? |
| OIL SEAL BREAKAGE | IS OIL LEAKING INSIDE HOUSING? |
| OIL SEAL BREAKAGE | IS ABNORMAL SOUND RINGING? |
| BEARING BURN-IN | IS HOUSING TEMPERATURE 100°C OR MORE? |
| BEARING BURN-IN | IS ABNORMAL SOUND RINGING? |
| ERRONEOUS SETTING | IS E111 OUTPUT? |
| ... | ... |

| PROBABILITY THAT "CABLE CONTACT FAILURE" HAS NOT OCCURRED (%) | PROBABILITY THAT "CABLE CONTACT FAILURE" HAS OCCURRED (%) |
|---|---|
| 90 | 10 |

| CABLE CONTACT FAILURE | STORAGE CAPACITY TIGHTNESS | PROBABILITY THAT "IS HOUSING LED LIT IN GREEN?" BECOMES YES (%) | PROBABILITY THAT "IS HOUSING LED LIT IN GREEN?" BECOMES NO (%) |
|---|---|---|---|
| NO OCCURRENCE | NO OCCURRENCE | 99 | 1 |
| NO OCCURRENCE | OCCURRENCE | 50 | 50 |
| OCCURRENCE | NO OCCURRENCE | 50 | 50 |
| OCCURRENCE | OCCURRENCE | 1 | 99 |

| 1D101 | 1D102 | INPUT CONDITION | | | | | OUTPUT CONDITION | | |
|---|---|---|---|---|---|---|---|---|---|
| | | PROMPTLY INVESTIGATE FAILURE CAUSE | RELIABLY INVESTIGATE FAILURE CAUSE | INVESTIGATE FAILURE CAUSE WITHOUT JIG | INVESTIGATE FAILURE CAUSE WITHOUT STOPPING WORK | SAFELY INVESTIGATE FAILURE CAUSE | REPAIR FAILURE CAUSE WITHOUT REPLACEMENT PARTS | REPAIR FAILURE CAUSE WITHOUT STOPPING WORK | SAFELY REPAIR FAILURE CAUSE |
| ASSET OWNER | REDUCTION IN WORK STOP TIME | ○ | — | — | ○ | — | — | ○ | — |
| | REDUCTION IN REPAIR COST | — | — | — | — | — | ○ | — | — |
| CALL CENTER | REDUCTION IN INVESTIGATION TIME | ○ | — | — | — | — | — | — | — |
| | IMPROVEMENT INITIAL SOLUTION RATE | — | ○ | — | — | — | — | — | — |
| | REDUCTION IN INVESTIGATION COST | — | — | ○ | — | — | ○ | — | — |
| | REDUCTION IN VISIT REQUEST RATE FOR MAINTENANCE EXECUTION TEAM | — | — | ○ | — | — | ○ | — | — |
| MAINTENANCE EXECUTION TEAM | REDUCTION IN INVESTIGATION TIME | ○ | — | — | — | — | — | — | — |
| | REDUCTION IN REPAIR TIME | — | — | — | — | — | — | — | — |
| | IMPROVEMENT IN INITIAL SOLUTION RATE | — | ○ | — | — | — | — | — | — |
| | REDUCTION IN INVESTIGATION COST | — | — | ○ | — | — | — | — | — |
| | REDUCTION IN INCIDENT GENERATION RATE | — | — | — | — | ○ | — | — | ○ |

|  | 1D201 | NAME OF INVESTIGATION ITEM (1D202) | | | | NAME OF FAILURE CAUSE (1D203) | | | |
|---|---|---|---|---|---|---|---|---|---|
|  |  | IS HOUSING LED LIT IN GREEN? | IS E111 OUTPUT? | IS HOUSING TEMPERATURE 100°C OR MORE? | ... | CABLE CONTACT FAILURE | STORAGE CAPACITY TIGHTNESS | BREAKAGE OF OIL SEAL (1D204) | ... |
| INPUT CONDITION | INVESTIGATE FAILURE CAUSE WITHOUT JIG | O | O | - | ... | - | - | - | ... |
|  | INVESTIGATE FAILURE CAUSE WITHOUT STOPPING WORK | O | O | O | ... | - | - | - | ... |
|  | SAFELY INVESTIGATE FAILURE CAUSE | O | O | - | ... | - | - | - | ... |
| OUTPUT CONDITION | REPAIR FAILURE CAUSE WITHOUT REPLACEMENT PARTS | - | - | - | ... | O | O | - | ... |
|  | REPAIR FAILURE CAUSE WITHOUT STOPPING WORK | - | - | - | ... | O | O | - | ... |
|  | SAFELY REPAIR FAILURE CAUSE | - | - | - | ... | O | O | O | ... |

| INPUT CONDITION | | NAME OF INPUT PROCEDURE GENERATION METHOD |
|---|---|---|
| PROMPTLY INVESTIGATE FAILURE CAUSE | RELIABLY INVESTIGATE FAILURE CAUSE | |
| – | – | FAILURE CAUSE ISOLATION–EMPHASIZED INPUT PROCEDURE GENEATION METHOD |
| ○ | – | FAILURE CAUSE IDENTIFICAION–EMPHASIZED INPUT PROCEDURE GENERATION METHOD |
| – | ○ | FAILURE CAUSE ISOLATION–EMPHASIZED INPUT PROCEDURE GENERATION METHOD |
| ○ | ○ | FAILURE CAUSE ISOLATION–EMPHASIZED INPUT PROCEDURE GENERATION METHOD |

| FAILURE CAUSE PROBABILITY THRESHOLD VALUE (%) | INVESTIGATION FREQUENCY THRESHOLD VALUE (TIMES) |
|:---:|:---:|
| 70 | 10 |

| USER | IMPORTANT KPI |
|------|---------------|
| ASSET OWNER | REDUCTION IN WORK STOP TIME |
| CALL CENTER | REDUCTION IN VISIT REQUEST RATE FOR MAINTENANCE EXCUTION TEAM |

| INPUT ORDER | NAME OF INVESTIGATION ITEM | SCORE |
|-------------|----------------------------|-------|
| 1 | IS HOUSING LED LIT IN GREEN? | 0.747 |
| 2 | IS E111 OUTPUT? | 0.253 |
| 3 | IS ABNORMAL SOUND RINGING? | 0.125 |
| . . . | . . . | . . . |

| NAME OF INVESTIGATION ITEM | ANSWER |
|---|---|
| IS HOUSING LED LIT IN GREEN? | YES |

| RECOMMENDATION ORDER | NAME OF FAILURE CAUSE | NAME OF REPAIR METHOD | RECOMMEDATION PROBABILITY |
|---|---|---|---|
| 1 | STORAGE CAPACITY TIGHTNESS | DELETION OF LOG | 0.75 |
| 2 | CABLE CONTACT FAILURE | PLUGGING/ UNPLUGGING OF CABLE | 0.15 |
| 3 | ERRONEOUS SETTING | RESETTING | 0.10 |

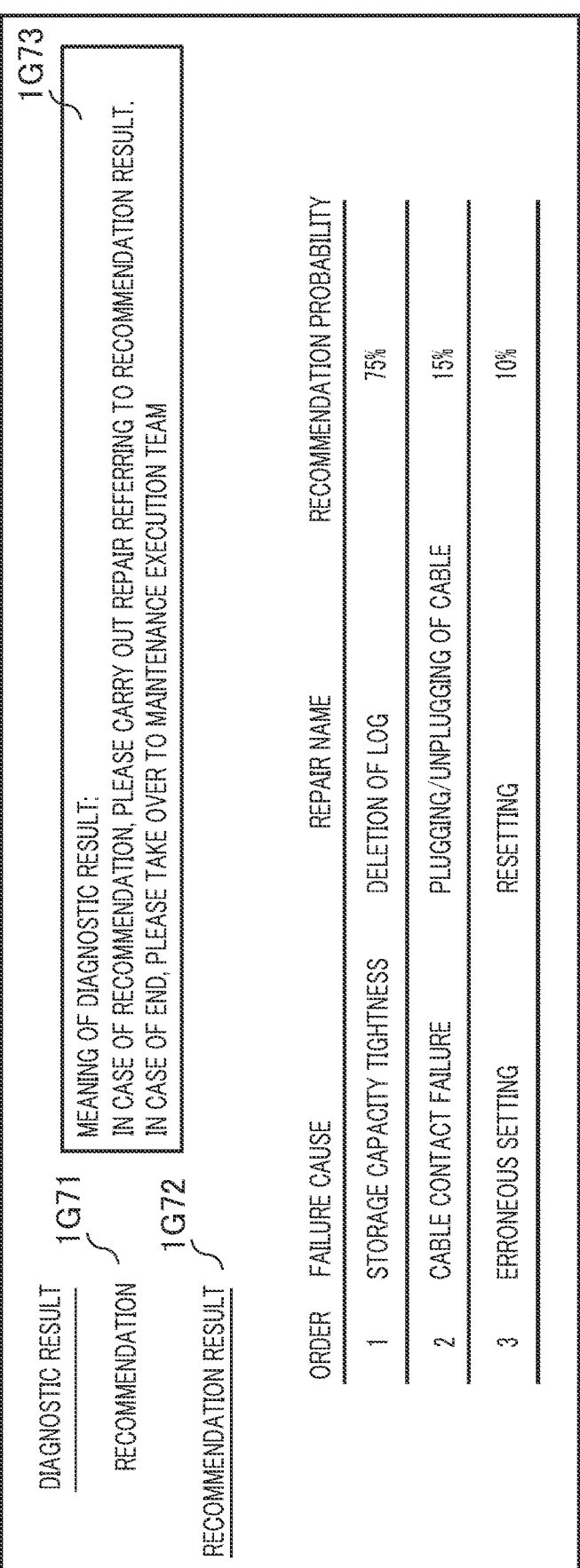

1G7

DIAGNOSTIC RESULT:

RECOMMENDATION          1G71

RECOMMENDATION RESULT          1G72

MEANING OF DIAGNOSTIC RESULT:
IN CASE OF RECOMMENDATION, PLEASE CARRY OUT REPAIR REFERRING TO RECOMMENDATION RESULT.
IN CASE OF END, PLEASE TAKE OVER TO MAINTENANCE EXECUTION TEAM          1G73

| ORDER | FAILURE CAUSE | REPAIR NAME | RECOMMENDATION PROBABILITY |
|---|---|---|---|
| 1 | STORAGE CAPACITY TIGHTNESS | DELETION OF LOG | 75% |
| 2 | CABLE CONTACT FAILURE | PLUGGING/UNPLUGGING OF CABLE | 15% |
| 3 | ERRONEOUS SETTING | RESETTING | 10% |

INFORMATION PROCESSING DEVICE, INPUT CONTROL METHOD AND PROGRAM

The present application claims priority from Japanese application serial no. JP2021-215089, filed on Dec. 28, 2021, the content of which is hereby incorporated by reference into this application.

BACKGROUND

The present invention relates to a technology of controlling the input to an AI engine. The present invention relates particularly to an input procedure generation device, a method of generating an input procedure to an AI engine on the basis of KPIs, and a repair recommend system.

With the development of an AI (Artificial Intelligence) technology, its practical use has recently been spread in various fields. For example, in the industrial field, a system (called a "repair recommend system") is being realized in which when a failure occurs in an asset such as a device, a facility, or a vehicle, an AI engine is allowed to learn repair history information obtained by collecting sets of failure information about the past asset and information about repairs made to the asset, and an appropriate repair method is recommended to a maintenance person.

In such a trend, the AI engine is not limited to improving the general answer accuracy in the machine learning field such as Accuracy and F-measure, but it is important how could various KPI (Key Performance Indicator) and KGI (Key Goal Indicator) related to the user's business be improved. For example, in the repair recommend system, KPI reductions of the time from the occurrence of a failure in an asset to investigating the cause of the asset failure and repairing it (called a failure repair time) and the cost of investigating and repairing the asset failure, etc. are essential.

On the other hand, in Japanese Unexamined Patent Application Publication No. 2019-133412, machine learning-based failure simulation is performed for maintenance methods having different conditions, and the conditions that give the best KPI in the simulation results are determined.

SUMMARY

Here, the utilization of the AI engine is divided into "input" and "output" as a time series. For example, in the case of the AI engine of the repair recommend system, the time-series range shared by the AI engine and the work takes from "failure cause investigation (input)" to "failure cause recommendation (output)". The time-series range is also the range in which the AI engine can contribute to an improvement of user's work KPIs.

However, the range in which the prior art contributes to the improvement of the KPI is only "failure cause recommendation (output)". There is not shown a KPI improvement proposal that considers other time-series ranges or the entire time-series range, thereby causing loss of opportunity for the KPI improvement by the AI engine.

For example, in a repair recommend system, when the reduction of "failure repair time" is a KPI given importance to, only the output of the AI engine, that is, "failure cause recommendation (output)" contributes to the improvement of the KPI. The AI engine's input, that is, "failure cause investigation (input)" has not contributed to the KPI improvement at all. Not only that, but the lack of consideration of the relationship between the input of the AI engine and the KPI can also be a hindrance to the validity of the output result of the AI engine and eventually to the improvement of the customer's KPI. For example, assume that the AI engine outputs a repair method or the like that completes the operation one hour earlier than usual with the reduction of "failure repair time" being emphasized. On the other hand, when the input takes an hour later than usual for the reasons that the input procedure to the AI engine nothing considers the relevant KPI or emphasizes other KPIs, etc., the one-hour reduction obtained by the output is offset by the input, and as a result, the customer's KPI is not considered at all. As in the example above, in order to evaluate whether the AI engine is truly contributing to the improvement of the customer's KPI, it is necessary to evaluate the entire time-series range from the input to output of the AI engine. However, these KPIs were heretofore only evaluated in the time series range of the output only or the input only, and much less consideration was given to whether or not the KPIs aimed at improving each input and output were consistent. Therefore, a problem arose in that that the AI engine may not have been able to realize customer KPI improvements through the entire time series range. The prior art does not pay attention to such a problem, and the problem itself is novel.

It is an object of the present invention to provide a method which can contribute to an improvement in KPIs even in the entire time series range through an input stage to an AI engine and its output stage.

According to a preferred aspect of the present invention, there is provided an information processing device using an AI engine, which includes an arithmetic section and a storage section. The arithmetic section executes an important KPI reception unit which receives important KPI information designated by a user, and a variable selection unit which selects an input variable input to the AI engine, on the basis of the important KPI information.

According to another preferred aspect of the present invention, there is provided an input control method of performing an input from an information processing device to an AI engine having a cause and an item as probability variables and represented by a network defining conditional dependency between the cause and the item, which executes important KPI reception processing of receiving important KPI information designated by a user, and variable selection processing of selecting an input variable input to the AI engine, on the basis of the important KPI information.

According to a further preferred aspect of the present invention, there is provided a program for performing an input from an information processing device to an AI engine having a cause and an item as probability variables and represented by a network defining conditional dependency between the cause and the item, which causes the information processing device to execute important KPI reception processing of receiving important KPI information designated by a user, and variable selection processing of selecting an input variable input to the AI engine, on the basis of the important KPI information.

Through the input stage to the AI engine and its output stage, it is possible to contribute to the improvement of KPIs even in the entire time series range.

BRIEF DESCRIPTION OF THE DRAWINGS

FIG. 4 is a structural diagram representing AI engine information by a network in the present embodiment;

FIG. 5 is a table diagram showing failure cause information in the AI engine information in the present embodiment;

FIG. 6 is a table diagram showing investigation item information in the AI engine information in the present embodiment;

FIG. 7 is a table diagram showing causality information between the faire cause and the investigation item in the AI engine information in the present invention;

FIG. 8A is a table diagram showing probability distribution information in the AI engine information in the present embodiment;

FIG. 8B is a table diagram showing probability distribution information in the AI engine information in the present embodiment;

FIG. 9 is a table diagram showing variable condition information for KPI in variable selection information in the present invention;

FIG. 10 is a table diagram showing variable information for variable condition information in variable selection information in the present embodiment;

FIG. 11 is a table diagram showing selection information of an input procedure generation method in the present embodiment;

FIG. 12 is a table diagram showing recommendation determination information in the present embodiment;

FIG. 13 is a table diagram showing important KPI information in the present embodiment;

FIG. 14 is a table diagram showing input procedure information in the present embodiment;

FIG. 15 is a table diagram showing investigation item answer information in the present embodiment;

FIG. 16 is a table diagram showing recommendation result information in the present embodiment;

FIG. 25 is an image diagram of a recommendation result display screen in the present embodiment.

DETAILED DESCRIPTION

Figure 1:
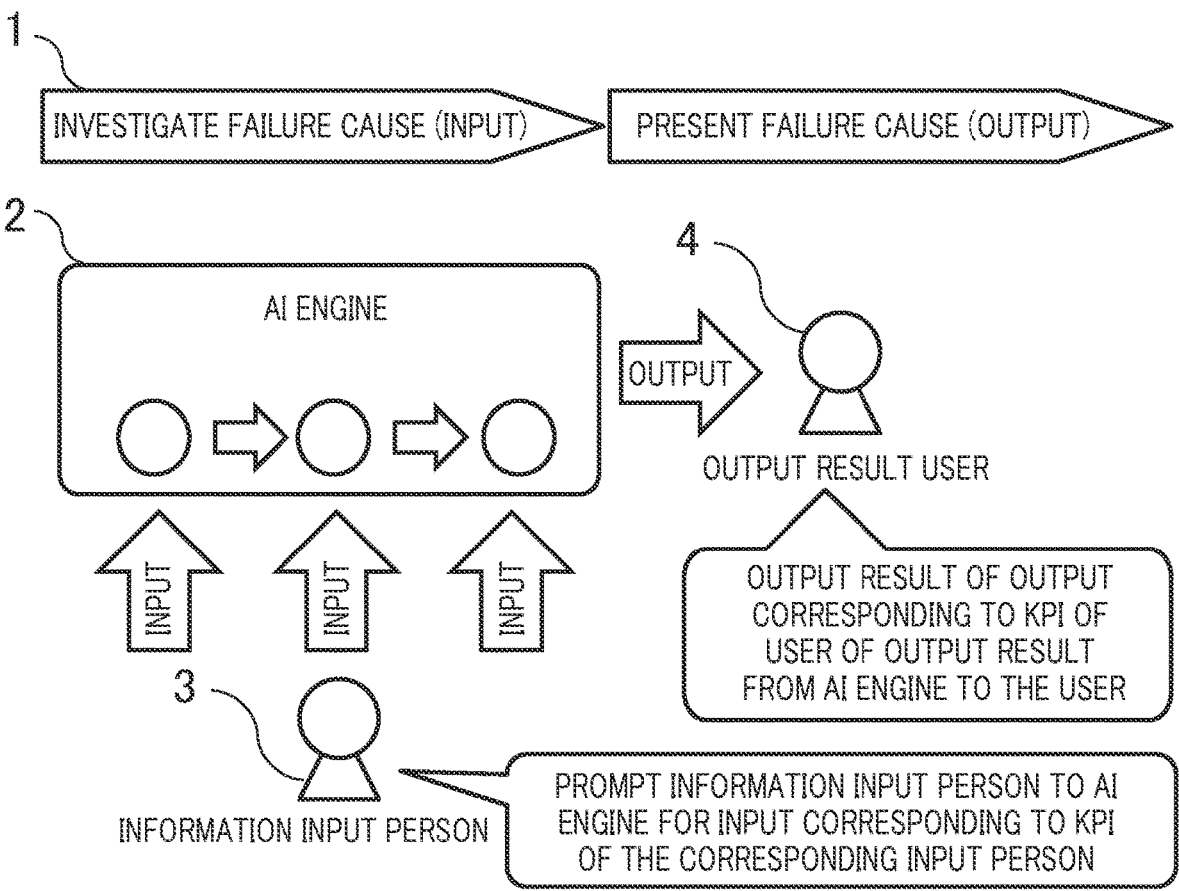
FIG. 1 is an image diagram showing a time series of "input" and "output" in an AI engine.

Hereinafter, embodiments of the present invention will be described in detail with reference to the accompanying drawings. However, the present invention is not construed as being limited to the description contents of the embodiments shown below. It is easily understood by those skilled in the art that a specific configuration thereof can be changed within the scope not departing from the idea or gist of the present invention.

In the configuration of the invention described below, the same reference numerals may be used in common among the different drawings for the same parts or parts having similar functions, and dual description may be omitted.

When there are a plurality of elements having the same or similar functions, they may be described by adding different subscripts to the same reference numerals. However, when it is not necessary to distinguish between a plurality of elements, the subscripts may be omitted for description.

The notations such as "first", "second", and "third" in the present specification and the like are attached to identify the components and do not necessarily limit the number, order or contents thereof. Further, the numbers for identifying the components are used for each context, and the numbers used in one context do not necessarily indicate the same constitution in other contexts. In addition, the component identified by a certain number is not prevented from functioning as the component identified by another number.

The position, size, shape, range, etc. of each configuration shown in the drawings and the like may not represent the actual position, size, shape, range, etc. in order to facilitate understanding of the invention. Therefore, the present invention is not necessarily limited to the position, size, shape, range, etc. disclosed in the drawings and the like. The publications, patents and patent applications cited in the present specification constitute part of the description of the present specification as they are.

Hereinafter, typical embodiments for carrying out the present invention will be described with reference to the drawings as appropriate. In the present embodiment, an input procedure generating device used in a repair recommend system that recommends an appropriate failure cause class on the basis of an AI engine when the assets mentioned even above malfunction or fail will be described in detail. The failure cause class is a number that uniquely determines the cause of failure and the content of repair operation therefor, and is often summarized as failure cause information in which the cause name of the failure and the operation name of the repair are linked.

One of the embodiments will be described. An embodiment of a preferred repair recommend system includes: an AI engine management unit which manages information indicating an input variable group, an output variable group, a causality group thereof, and a probability distribution; a variable selection information management unit which manages variable selection information for selecting an input variable, on the basis of a Key Performance Indicator (KPI) related to the user's business; an important KPI reception unit which receives important KPI information indicating the KPI made important to a user; a variable selection unit which selects an input variable group; an input procedure generation unit which generates input procedure information indicating the order of input variables input to an AI engine; an input reception unit to which the user inputs the value of an input variable on the basis of the input procedure information; a recommendation probability calculation unit which calculates the probability of an output variable by using the value of the received input variable, the selected input variable group, and AI engine information; and a recommendation result display unit which displays the calculated probability of output variable.

In this system, the variable selection unit selects the input variable group on the basis of the important KPI information and the variable selection information, and the input procedure generation unit generates the input procedure information indicating the order of the input variables, on the basis of the selected input variable group, the important KPI information, and the AI engine information.

In the present specification and the like, the KPI is assumed to be a concept that broadly refers to indicators indicating arbitrary value standards that users place importance on. By generating the input procedure to the AI engine on the basis of the KPI on which the user places importance, the KPI can be improved inclusive of from the input to the output. Also, different KPIs can be improved for the input and the output.

First Embodiment

<1. Overview>

FIG. 1 is a diagram showing a time series of "input" and "output" in the AI engine of the repair recommend system. In FIG. 1, there is shown a relationship between a time series range 1 of "failure cause search (input)" and "failure cause recommendation (output)", an AI engine 2 which outputs a failure cause based on input information, an information input person 3 who inputs information about the asset that has failed to the AI engine, and an output result user 4 who performs repair based on the output result from the AI engine.

Here, the AI engine can contribute to the improvement in KPI in the work of the information input person 3 and the output result user 4 in the time series range 1. However, in the AI engine of the conventional technique, the output result is only output according to the KPI of the output result user 4 in the "failure cause recommendation (output)", so that the opportunity loss of the KPI improvement by the AI engine is caused.

In this respect, in the present embodiment, the KPI can be improved in the entire time series range 1 by recommending the input procedure according to the KPI of the corresponding input person to the information input person to the AI engine. Further, different KPIs can be improved between the information input person 3 and the output result user 4.

In the present embodiment, description will be made as to a configuration which realizes a recommendation system that can improve KPIs all the way from the input to the output by generating input procedure information to the AI engine on the basis of KPIs on which the user places importance.

Incidentally, although FIG. 1 illustrates that the information input person 3 and the output result user 4 are different persons, they may be the same person.

The processing of a registration phase and a recommendation phase in the repair recommend system will be described with reference to FIG. 2. The registration phase refers to the flow up to performing registration of the AI engine, registration of the variable selection information management unit, and registration of recommendation determination information. The recommendation phase refers to the flow up to the request for repair from the asset owner to the call center, the start of use of the repair recommend system from the call center, the recommendation of the input procedure from the repair recommend system to the call center, the information collection according to the input procedure by the call center, and the recommendation of the cause of failure on the basis of the input information. The outline of the repair recommend system 10 will be described separately for the registration phase and the recommendation phase.

An asset 20 is a device, equipment, vehicle, or the like. An asset owner 15 is the owner or manager of the asset 20. When the asset 20 fails, the asset owner 15 requests the call center 16 to repair it. In response to the repair request of the asset owner 15, the call center 16 repeatedly inquires of the asset owner 15 about the state of the asset 20 and identifies the cause of the failure. If the identified failure cause is a failure cause that can be repaired only by the asset owner 15, a repair method is answered. If the cause of the failure cannot be identified or the failure cannot be cured by the asset owner 15, a maintenance execution team 17 will take over. The maintenance execution team 17 visits the equipment and factory where the asset 20 is installed to identify the cause of the failure and repair it.

<1-1. Registration Phase>

Figure 2:
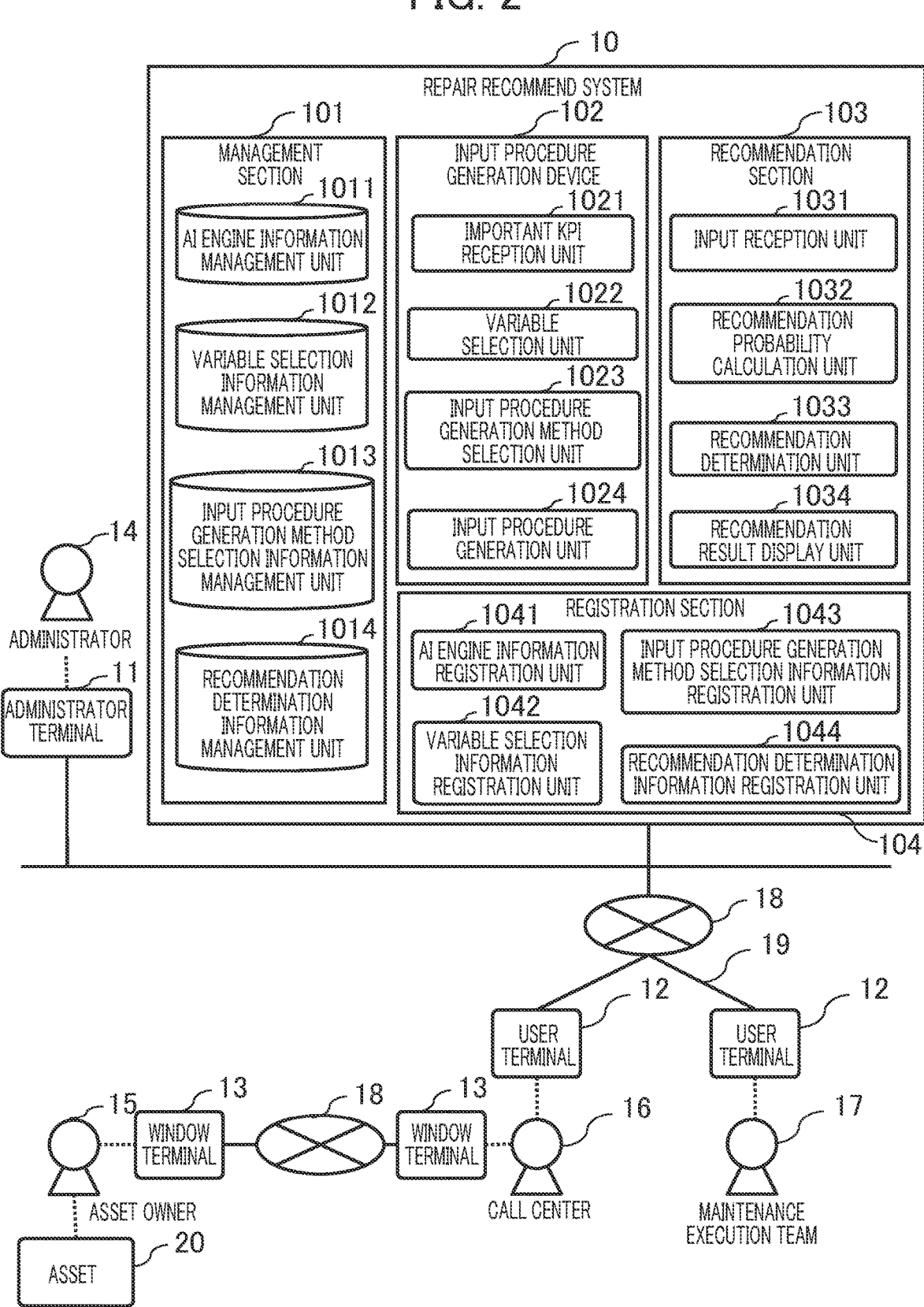
FIG. 2 is a block diagram of a configuration of a repair recommend system in the present embodiment.

In FIG. 2, first, in the registration phase, an administrator 14 uses as AI engine information, an input variable (hereinafter called an "investigation item") indicating the state of the asset 20, an output variable (hereinafter called a "failure cause") indicating failure cause information of the asset 20, causality between the investigation item and the failure cause, and a probability distribution that expresses causality as a probability, and transmits the same to the repair recommend system 10 via an administrator terminal 11.

The repair recommend system 10 receives information sent from the administrator at an AI engine information registration unit 1041 and manages it as AI engine information in an AI engine information management unit 1011. The AI engine information will be described later with reference to FIGS. 4 to 8.

Next, the administrator 14 transmits via the administrator terminal 11 to the repair recommend system 10, a KPI for each user, the work of searching for the cause of the failure in order to improve the KPI, variable condition information for the KPI associated with the conditions for repairing the cause of the failure, each investigation item, variable information for the variable condition summarizing which variable condition information the cause of the failure satisfies. The repair recommend system 10 receives the information sent from the administrator by a variable selection information registration unit 1042, and manages the variable condition information for the KPI and the variable information for the variable condition as the variable selection information at a variable selection information management unit 1012. The variable selection information will be described later with reference to FIGS. 9 and 10.

Then, the administrator 14 sends input procedure generation method selection information summarizing which input procedure generation method is suitable for the input condition to the repair recommend system 10 via the administrator terminal 11. Here, the input procedure generation method is a method of ranking which investigation item answers should be input. In the repair recommend system 10, an input procedure generation method selection information registration unit 1043 receives the input procedure generation method selection information, and an input procedure generation method selection information management unit 1013 manages the input procedure generation method selection information. The input procedure generation method selection information will be described later with reference to FIG. 11.

After that, the administrator 14 transmits to the repair recommend system 10 via the administrator terminal 11, a recommendation probability threshold value for whether to be presented to the user as the cause of the failure if the probability of the failure cause calculated by the AI engine on the basis of the answers to the investigation items of the user is above what number, and an investigation frequency threshold value of how many times an additional investigation item needs to be answered to the user when the probability of each failure cause is lower than the recommendation probability threshold value. The repair recommend system 10 receives the information sent from the administrator in a recommendation determination information registration unit 1044, and manages the recommendation probability threshold value and the investigation frequency threshold value as the recommendation determination information in a recommendation determination information management unit 1014. The recommendation determination information will be described later with reference to FIG. 12.

<1-2. Recommendation Phase>

Next, in the recommendation phase, when a failure occurs in the asset 20, the asset owner 15 transmits a repair request for the asset 20 and a KPI (called an "important KPI") that is important in the repair to the call center 16 via a window terminal 13. The call center 16 sends the KPIs on which the asset owner 15 places importance and the KPIs on which the call center 16 places importance to the repair recommend system 10 via a user terminal 12. The repair recommend system 10 receives the information sent from the call center 16 at an important KPI reception unit 1021.

Next, a variable selection unit 1022 extracts an input variable condition group and an output variable condition group corresponding to the KPI from the variable condition information for the KPI managed in the variable selection information management unit 1012 and the important KPI sent from the call center 16. Thereafter, the variable selection unit 1022 selects an investigation item group and a failure cause group which satisfy the variable condition group from the variable information for the variable condition managed in the variable selection information management unit 1012.

Next, an input procedure generation method selection unit 1023 selects one input procedure generation method from the input procedure generation method selection information and the input variable condition group managed in the input procedure generation method selection information management unit 1013.

Next, an input procedure generation unit 1024 ranks which investigation items should be answered based on the investigation item and the failure cause selected by the variable selection unit 1022, the input procedure generation method selected by the input procedure generation method selection unit 1023, and the AI engine information.

Next, an input reception unit 1031 presents the investigation items ordered by the input procedure generation unit 1024 to the call center 16 via the user terminal 12. The call center 16 inquires of the asset owner 15 about the state of the asset 20 via the window terminal 13 on the basis of the presented investigation items. The asset owner 15 investigates the state of the asset 20 and transmits its answer result to the call center 16 via the window terminal 13. The call center 16 inputs the answer result to the input reception unit 1031.

Then, a recommendation probability calculation unit 1032 calculates the probability of each failure cause on the basis of the answer to each investigation item received in the input reception unit 1031.

After that, a recommendation determination unit 1033 determines whether to make a recommendation, continue the input or end the input on the basis of the answers to the investigation items received by the input unit, the calculated probability of each failure cause, the investigation item selected by the variable selection unit 1022, and the recommendation probability threshold value and the investigation frequency threshold value managed in the recommendation determination information management unit 1014.

When making the recommendation, the recommendation result display unit 1034 recommends the failure cause information of the failure cause having the highest probability to the call center 16. The call center 16 transmits the failure cause information to the asset owner 15 on the basis of the recommended failure cause information. The asset owner 15 repairs the asset 20 on the basis of the transmitted failure cause information.

When continuing the input, the procedure therefor returns to the input procedure generation unit 1024, where which investigation item should be answered is re-ranked on the basis of the failure cause selected by the variable selection unit 1022, the input procedure generation method selected by the input procedure generation method selection unit 1023, the AI engine information, and the answer of each investigation item accepted by the input reception unit 1031.

After that, the input reception unit 1031 presents the investigation items ordered by the input procedure generation unit 1024 to the call center 16 again via the user terminal 12 and prompts for an additional answer. When this is terminated, the recommendation result display unit 1034 recommends that the call center 16 take over to the maintenance execution team 17.

The call center 16 requests the maintenance execution team 17 for repair. The maintenance execution team 17 visits the equipment and factory where the asset 20 is installed, and sends the KPI on which the asset owner 15 places importance and the important KPI of the maintenance execution team 17 to the repair recommend system 10. After that, the maintenance execution team 17 uses the repair recommend system 10 in the same manner as the call center 16 to search for the cause of failure of the asset 20 and repair it.

<2. System Configuration>

<2-1. Functional Block>

Description will be made as to a configuration of a system according to the present embodiment with reference to FIG. 2. The present system includes as components, the repair recommend system 10, the administrator terminal 11 operated by the administrator, the user terminals 12 operated by the call center 16 and the maintenance execution team 17, the asset 20 owned by the asset owner 15, and the window terminals 13 through which the call center and the asset owner talk to each other.

These components are mutually connected by a communication line 18 by wire or wireless. The communication line 18 itself is comprised of a telephone line, a LAN (Local Area Network), a WAN (Wide Area Network), or the like. Incidentally, the above components are examples, and the number of components may be increased or decreased. For example, for distributed processing, the repair recommend system 10 may be divided into multiple parts.

The details of the repair recommend system 10 will be described. The repair recommend system 10 includes a management section 101, an input procedure generation device 102, a recommendation section 103, and a registration section 104.

The management section 101 includes the variable selection information management unit 1012, the input procedure generation method selection information management unit 1013, the AI engine information management unit 1011, and the recommendation determination information management unit 1014.

The input procedure generation device 102 includes the important KPI reception unit 1021, the variable selection unit 1022, the input procedure generation method selection unit 1023, and the input procedure generation unit 1024.

The recommendation section 103 includes the input reception unit 1031, the recommendation probability calculation unit 1032, the recommendation determination unit 1033, and the recommendation result display unit 1034.

The registration section 104 includes the AI engine information registration unit 1041, the variable selection information registration unit 1042, the input procedure generation method selection information registration unit 1043, and the recommendation determination information registration unit 1044. Incidentally, in the recommendation phase, for example, the registration section may be omitted.

<2-2. Function and Hardware>

Figure 3:
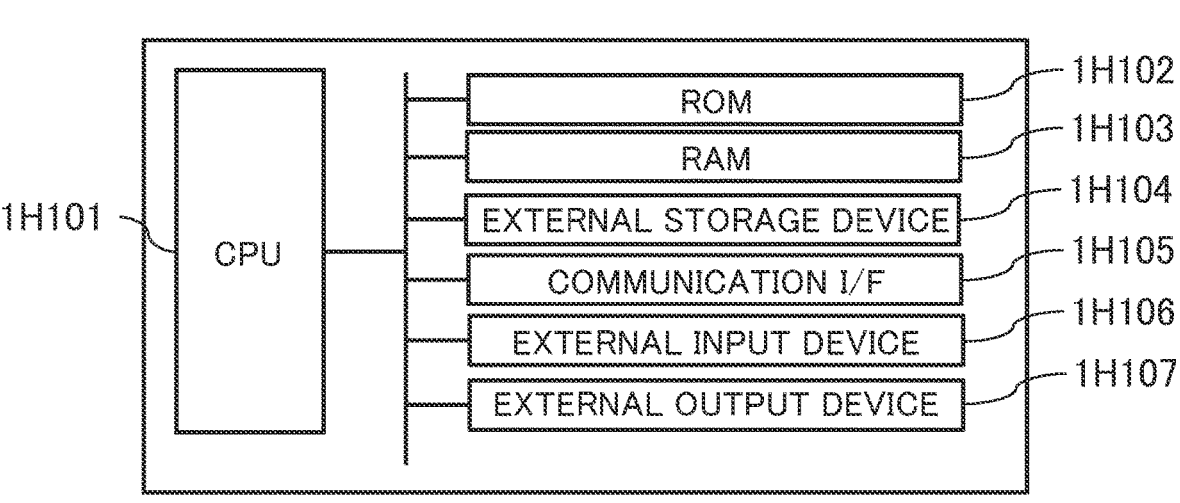
FIG. 3 is a block diagram of a hardware configuration in the present embodiment.

FIG. 3 shows an example of a hardware configuration of the repair recommend system 10. Next, the correspondence between the functions and the hardware will be described with reference to FIGS. 2 and 3. FIG. 2 shows an example of a functional configuration included in the repair recommend system 10. The hardware of the repair recommend system 10 is comprised of, for example, a computer like a server device.

The management section 101, the input procedure generation device 102, the recommendation section 103, and the registration section 104 included in the repair recommend system 10 shown in FIG. 2 respectively include a CPU (Central Processing Unit) 1H101, a ROM (Read Only Memory) 1H102, a RAM (Random Access Memory) 1H103, an external storage device 1H104, a communication I/F (Interface) 1H105, an external input device 1H106 represented by a mouse, a keyboard or the like, and an external output device 1H107 represented by a display or the like, which are shown in FIG. 3.

Various functions are realized by the CPU 1H101 reading a program stored in the ROM 1H102 or the external storage device 1H104 into the RAM 1H103 and controlling the communication I/F 1H105, the external input device 1H106, and the external output device 1H107.

In the present embodiment, the functions such as calculation and control in the computer are realized by executing the program stored in the storage device such as ROM1H102 and the external storage device 1H104 by the processor such as CPU1H101 and thereby making the defined processing in cooperation with hardware. A program executed by a computer or the like, a function thereof, or a means for realizing the function may be referred to as a "function" a "means", a "part", a "unit", a "module", a "model", or the like.

The repair recommend system 10 may be configured by a single computer, or any part may be configured by another computer connected by a network. The idea of the invention is equivalent and unchanged. Further, in the present embodiment, the same function as the function configured by software can be realized even by a circuit (hardware) such as an FPGA (Field Programmable Gate Array) and an ASIC (Application Specific Integrated Circuit).

As described above, the repair recommend system using the embodiment includes a storage device for storing information and a computer including one or more processors connected to the storage device. The computer's storage device stores AI engine information using a Bayesian network and variable selection information to select input variables on the basis of the KPI related to the user's business. The computer's processor performs the following processing of (X1) to (X6):

(X1) the first processing of inputting important KPI information indicating the KPI on which the user places importance, (X2) the second processing of selecting an input variable group using the important KPI information and the variable selection information, (X3) the third processing of generating input procedure information indicating the order of input variables to be input to the AI engine using the selected input variable and AI engine information, (X4) the fourth processing of inputting the value of the input variable using the input procedure information, (X5) the fifth processing of calculating the probability of an output variable using the value of the input variable input in the fourth processing, the selected input variable group, and the AI engine information, and (X6) the sixth processing of displaying the probability of the output variable calculated in the fifth processing.

<2-3. Data Structure>

<2-3-1. AI Engine Information>

The AI engine information managed by the AI engine information management unit 1011 of the management section of the repair recommend system 10 will be described with reference to FIGS. 4 to 8. Although not particularly limited, in the present embodiment, a Bayesian network is assumed to be used as the AI engine. The Bayesian network is a type of graphical model that can visually describe the structure of a probability model.

FIG. 4 shows an outline of the Bayesian network used in the AI engine of the repair recommend system 10 in the present embodiment. There are two types of Bayesian network probability variables as a failure cause 1B101 and an investigation item 1B102. The conditional dependency (probabilistic dependent relation) between the failure cause and the investigation item is indicated by an arrow 1B103. The Bayesian network of FIG. 4 can be defined by the data structures of FIGS. 5 to 8. In the AI engine, the investigation item is used as an input variable, and the cause of failure is used as an output variable. Hereinafter, details will be described.

Description will be made as to failure cause information 1T1 in AI engine information 1T with reference to FIG. 5. The failure cause information includes a failure cause name 1T11 which describes the name of the failure cause and a repair method name 1T12 which describes the name of the repair method. Incidentally, in the present embodiment, the failure cause information includes the above items, but may include items related to repair operation such as the repair type linked to a repair procedure manual or the like, the file of the repair procedure manual or the like, or the URL (Uniform Resource Locator) or the like. Alternatively, it may include some of the above items.

Description will be made as to investigation item information 1T2 in the AI engine information 1T with reference to FIG. 6. The investigation item information includes an investigation item name 1121 which describes the name of the investigation item. Incidentally, in the present embodiment, the investigation item information includes the above items, but may include items related to investigation operation such as an investigation procedure linked to a troubleshooting flow or the like, and the parts required for the investigation. Some of the above items may be included therein.

Description will be made as to causality information 1T3 between the cause of failure and the investigation item in the AI engine information with reference to FIG. 7. The causality information 1T3 includes a failure cause name 1T31 which describes the cause of the failure that becomes the parent of the investigation item, and an investigation item name 1T32 which describes the investigation item which serves as the child.

Description will be made as to probability distribution information 1T4 in the AI engine information with reference to FIGS. 8A and 8B. FIG. 8A is a probability distribution 1T41 of each failure cause in the probability distribution information 1T4. FIG. 8B is a probability distribution 1T42 of each investigation item in the probability distribution information 1T4.

The failure cause probability distribution 1T41 of FIG. 8A includes an item 1T411 which describes the probability that the failure cause has not occurred when an asset failure occurs, and an item 1T412 which describes the probability that the failure cause has occurred.

An item 1T422 of FIG. 8B is a simultaneous probability distribution which describes the probability of answering the investigation item to the state of the cause of failure that becomes the parent of the investigation item. The probability distribution of the investigation items includes an item 1T421 which describes the state of the failure cause, an item 1T422 which describes the probability that the answer to the investigation item is YES, and an item 1T423 which describes the probability that the answer to the investigation item is NO. The item 1T421 may have an arbitrary number, and the state of the failure cause can be expressed by a combination of the states indicated by the item 1T421 of an arbitrary number.

Incidentally, in the present embodiment, the answers to the investigation items are two values of YES and NO, but may be two or more answers as in the case of three values of YES, NO and unknown, and four values of green lighting, red lighting, blinking and extinguishing. There may be two or more answers.

In the present embodiment, the AI engine information 1T is assumed to be created by the administrator from design/maintenance information related to assets such as product specifications, maintenance procedures, FMEA (Failure Mode and Effects Analysis), and FT (Fault Tree), but may be created using a structural learning algorithm of a Bayesian network such as a K2 algorithm from a repair history that collects the answer group of investigation items that occurred at the time of the asset failure and the set of the failure causes at that time.

Further, the description format of the AI engine information 1T shown in FIGS. 5 to 8 is a generally known description format of the Bayesian network, and may be another format to describe the Bayesian network.

Further, the AI engine may be a simplified model of a Bayesian network such as Naive Bayes, or an approximate model of a Bayesian network such as a Noisy-max model.

<2-3-2. Variable Selection Information>

Description will be made as to the variable selection information managed by the variable selection information management unit 1012 of the management section of the repair recommend system 10 with reference to FIGS. 9 and 10.

FIG. 9 shows the variable condition information 1D1 for the KPI in the variable selection information 1D. The variable condition information 1D1 for the KPI includes a user list 1D101, a KPI list 1D102 for each user, an input condition list 1D103, an output condition list 1D104, and an entry field 1D105.

In the entry field 1D105, a mark indicating whether or not the corresponding KPI can be improved is described. For example, when the input condition is "quickly investigating the cause of a failure", it is marked as being able to improve a reduction in the work stop time for the asset owner in the KPI, a reduction in the investigation time of the call center, and a reduction in the investigation time of the maintenance execution team.

Incidentally, in the present embodiment, when it can be improved, it is marked with "○ (circle)", and when it cannot be improved or is irrelevant, it is marked with "-". However, those other than these symbols may be used or the numerical value that represents the degree of influence may be used. Variable condition information for KPIs may be managed separately for input and output, or may be managed only for input.

In the example of FIG. 9, the conditions are defined for each asset owner, call center, and maintenance execution team, but for example, different conditions may be defined for each of a plurality of asset owners.

FIG. 10 shows variable information 1D2 for the variable condition in the variable selection information 1D. The variable information 1D2 for variable conditions includes a list 1D201 of input conditions and output conditions, a list 1D202 of investigation item names, a list 1D203 of failure cause names, and an entry field 1D204. In the entry field 1D204, a mark indicating whether or not the corresponding input condition is satisfied is described.

For example, when the investigation item name is "Is a housing LED lit in green?", it is marked as satisfying the conditions that the failure cause is investigated without jigs in the input condition, the failure cause is investigated without stopping the work, and the failure cause is investigated safely.

In the present embodiment, when it can be improved, it is marked with a "○ (circle)", and when it cannot be improved or is irrelevant, it is marked with a "-". However, those other than these symbols may be used or the numerical value that represents the degree of influence to the KPI may be used. The variable information for the variable condition may be managed separately for input and output, or may be managed only for input. The input conditions and the output conditions described in the list of the input conditions and the list of the output conditions may be a part. The investigation items and the failure causes described in the list of the investigation item names and the list of the failure cause names may be a part.

In the present embodiment, a hierarchical structure is used in which variable conditions are linked to the important KPI information, and variables for investigation items and failure causes are linked to variable conditions, but the variables may be linked to the important KPI information. Further, other hierarchical structures may be used.

<2-3-3. Input Procedure Generation Method Selection Information>

Description will be made as to input procedure generation method selection information 1S managed by the input procedure generation method selection information management unit 1013 of the management section 101 of the repair recommend system 10 with reference to FIG. 11. The input procedure generation method selection information 1S describes which input procedure generation method is used to rank investigation items for input conditions.

The input procedure generation method selection information 1S includes an input condition 1S1 which describes the input conditions necessary for selecting the input procedure generation method, and an input procedure generation method name 1S2 which describes the name of the input procedure generation method for ranking the investigation items.

In the present embodiment, the input procedure generation method is selected in which the plurality of items are ordered on the basis of the combination of input conditions. That is, the input procedure generation method is selected on the basis of the two input conditions of "promptly investigating the cause of the failure" and "reliably investigating the cause of the failure". However, one input condition may be taken, or the combination of three or more input conditions may be taken.

<2-3-4. Recommendation Determination Information>

Description will be made as to recommendation determination information 1X managed by the recommendation determination information management unit 1014 of the management section 101 of the repair recommend system 10 with reference to FIG. 12. The recommendation determination information includes a recommendation probability threshold value 1X1 for whether to be presented to the user as the cause of the failure if the probability of the failure cause calculated by the AI engine on the basis of the answers to the investigation items of the user is above what number, and an investigation frequency threshold value 1X2 of how many times an additional investigation item needs to be answered to the user when the probability of each failure cause is lower than the recommendation probability threshold value.

<2-3-5. Important KPI Information>

Description will be made as to important KPI information 1R1 received from the call center 16 via the user terminal 12 by the important KPI reception unit 1021 of the input procedure generation device 102 of the repair recommend system 10 with reference to FIG. 13. The important KPI information 1R1 includes a user name 1R101 related to asset repair and an important KPI1R102 describing the user's important KPI. The important KPI information 1R1 is collected and stored in advance from each user by the call center 16, or is collected from each user at the start of the recommendation phase.

<2-3-6. Input Procedure Information>

Description will be made as to input procedure information 1R2 presented to the call center 16 via the user terminal 12 by the input reception unit 1031 of the recommendation section of the repair recommend system 10 with reference to FIG. 14. The input procedure information 1R2 includes an input order 1R201 indicating which investigation item should be investigated, an investigation item name 1R202, and a score 1R203 as a basis for ranking.

<2-3-7. Investigation Item Answer Information>

The investigation item answer information 1R3 that the call center 16 inputs to the input reception unit 1031 of the recommendation section 103 of the repair recommend system 10 via the user terminal 12 will be described with reference to FIG. 15. The investigation item answer information 1R3 includes an investigation item name 1R301 indicating the name of the investigation item performed on the asset and an answer 1R302 indicating the answer to the investigation item. The investigation item answer information 1R3 becomes an input variable to be input to the AI engine 2.

<2-3-8. Recommendation Result Information>

The recommendation result information 1R4 recommended to the call center 16 via the user terminal 12 by the recommendation result display unit 1034 of the recommendation section 103 of the repair recommend system 10 will be described with reference to FIG. 16. The recommendation result information 1R4 includes a recommendation order 1R401 describing the order of recommended failure causes, a failure cause name 1R402, a repair method name 1R403, and a recommendation probability 1R404 indicating the probability of the failure cause.

<3. Processing Flow of Registration Phase>

Figure 17:
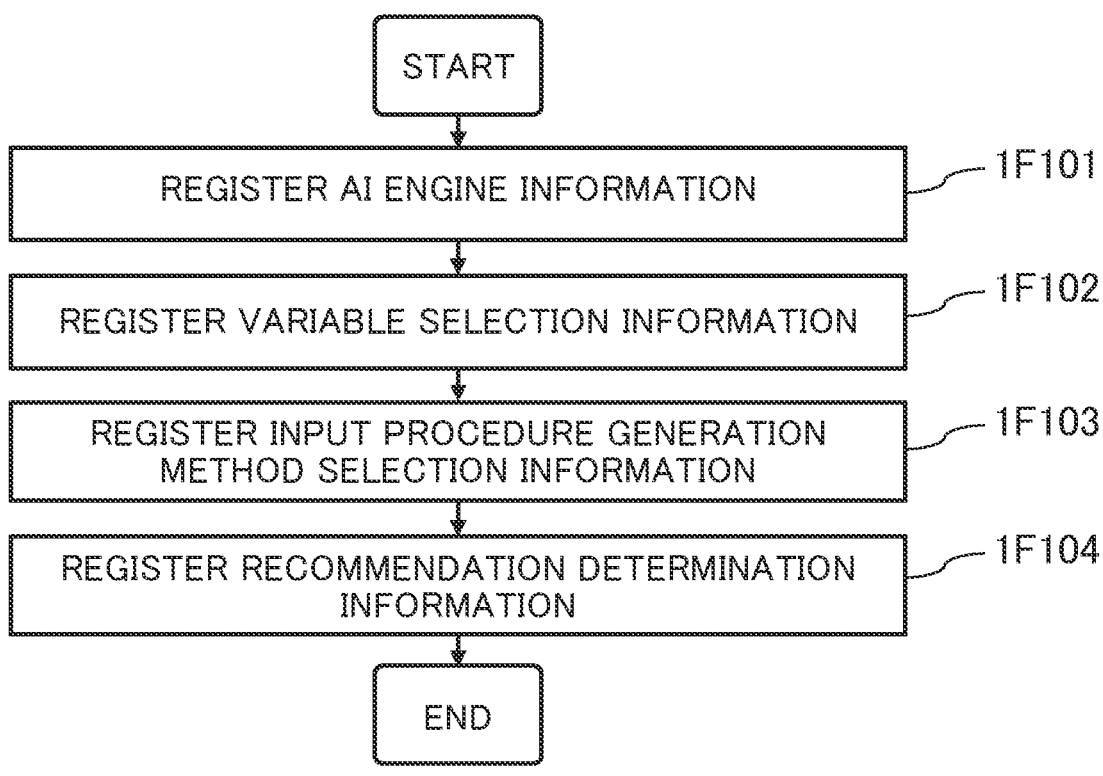
FIG. 17 is a processing flow of a registration phase in the present embodiment.

The processing flow of the registration phase will be described with reference to FIG. 17.

First, the AI engine information registration unit 1041 registers the AI engine information 1T input by the administrator 14 via the administrator terminal 11 in the AI engine information management unit 1011 (step 1F101).

Next, the variable selection information registration unit 1042 registers the variable condition information 1D1 for the KPI and the variable information 1D2 for the variable condition which are input from the administrator 14 via the administrator terminal 11 in the variable selection information management unit 1012 (Step 1F102).

After that, the input procedure generation method selection information registration unit 1043 registers the input procedure generation method selection information 1S input from the administrator 14 via the administrator terminal 11 in the input procedure generation method selection information management unit 1013 (Step 1F103).

Then, the recommendation determination information registration unit 1044 registers the recommendation determination information 1X input from the administrator 14 via the administrator terminal 11 in the recommendation determination information management unit 1014 (Step 1F104).

Incidentally, the order of Steps 1F101, 1F102, 1F103, and 1F104 may be reversed. If the AI engine information 1T, variable selection information 1D, input procedure generation method selection information 1S, and recommendation determination information 1X are respectively registered in each management section in advance, Steps may be skipped.

<4. Processing Flow of Recommendation Phase>

Figure 18:
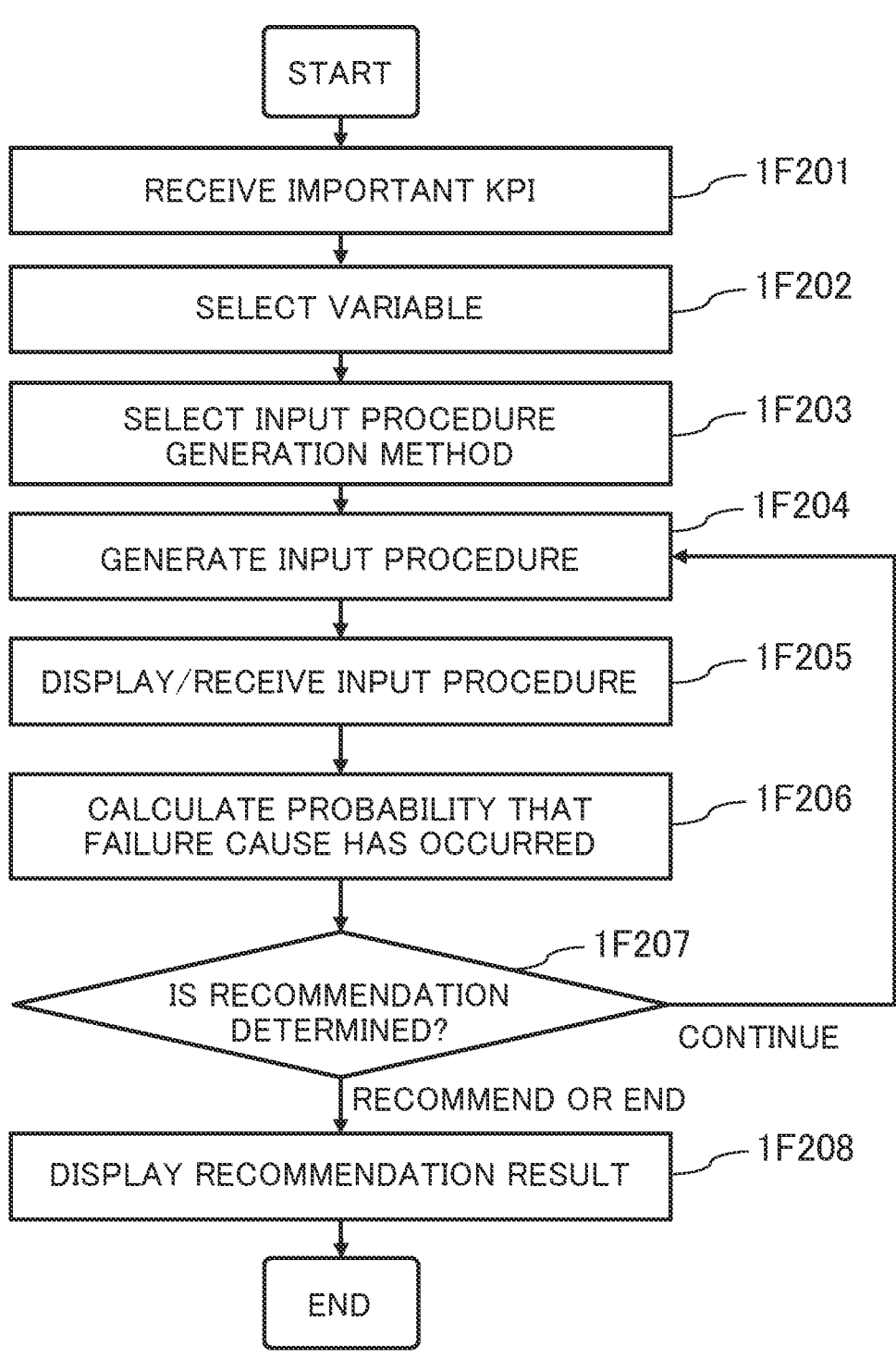
FIG. 18 is a processing flow of a recommendation phase in the present embodiment.

The processing flow of the recommendation phase will be described with reference to FIG. 18.

First, the important KPI reception unit 1021 receives the important KPI information 1R1 (FIG. 13) from the call center 16 via the user terminal 12 (Step 1F201).

Next, the variable selection unit 1022 extracts the input condition group and the output condition group marked for the important KPI from the variable condition information 1D1 (FIG. 9) and the important KPI information 1R1 (FIG. 13) for the KPI managed by the variable selection information management unit 1012. For example, if the important KPI information is a "reduction in the work stop time for the asset owner" and a "reduction in the call center visit request rate for the maintenance execution team", the input condition group becomes "promptly investigate the cause of failure", "investigate the cause without stopping the work", and "investigate the failure cause without the jig", and the output condition group becomes "repair the cause of failure without stopping the work" and "repair the cause of failure without replacement parts".

After that, from the variable information 1D2 (FIG. 10) for the variable conditions managed by the variable selection information management unit 1012 and the extracted input condition group and output condition group, an investigation item name group and a failure cause name group marked for the input condition group and the output condition group are selected. For example, in the case of the input condition group and the output condition group both extracted in the example above, the investigation item name group will be "a housing LED is lit in green", "Is E11 output?", etc., and the failure cause name group will be "cable contact failure", "memory capacity tightness", etc. (Step 1F202).

Next, the input procedure generation method selection unit 1023 selects an input procedure generation method from the input procedure generation method selection information 1S (FIG. 11) managed by the input procedure generation method selection information management unit 1013 and the extracted input condition group. For example, in the above example, since the input condition is "quickly investigate the cause of failure", a "method of generating an input procedure emphasizing failure cause identification" is selected (step 1F203).

Next, the investigation items are ranked to determine which investigation items should be answered, on the basis of the AI engine information 1T (FIGS. 5 to 8B) managed by the AI engine information management unit 1011, the investigation item name group selected by the variable selection unit 1022, the failure cause name group, and the input procedure generation method selected by the input procedure generation method selection unit 1023, and the input procedure information 1R2 (FIG. 14) is generated (Step 1F204).

In the present embodiment, as the method of generating the input procedure information, there are two of a method of generating an input procedure emphasizing failure cause identification, and a method of generating an input procedure emphasizing failure cause isolation. Each input procedure generation method will be described in detail below.

The failure cause identification-emphasized input procedure generation method is an input procedure generation method capable of reducing the number of answers to the investigation items by assigning a high score to the investigation items that more increase the probability of high-probability failure causes that are likely to occur when the answers to the investigation items are obtained. However, the failure cause identification-emphasized input procedure generation method may leave many failure causes with the probability of occurring at the time of recommendation being not 0%, and may not identify the failure cause with certainty. Therefore, it is suitable for situations such as when the asset owner's work is suspended due to an asset failure.

As a specific method of assigning scores, for example, it is the sum of squares of the conditional probabilities of each recommendation probability when the answers to the investigation items are obtained. Assuming the number of investigation item name groups selected by the variable selection unit 1022 to be I, and the number of failure cause name groups selected by the variable selection unit 1022 to be C, and assuming each investigation item name to be an investigation item i (=1, 2, . . . , I), and each failure cause name to be a failure cause c (=1, 2, . . . , C), the score of the investigation item i is calculated by:

$$
\begin{aligned}
\text{score of the investigation item } i = &(\text{probability of fail-} \\
&\text{ure cause 1 occurring when the answer to the} \\
&\text{investigation item } i \text{ is obtained})^2 + (\text{probability} \\
&\text{of failure cause 2 occurring when the answer to} \\
&\text{the investigation item } i \text{ is obtained})^2 + \ldots + \\
&(\text{probability of occurrence of failure cause } C \\
&\text{when the answer to the investigation item } i \text{ is} \\
&\text{obtained})^2.
\end{aligned}
$$

This allows higher scores to be assigned to the investigation items that give higher probabilities of failure causes with higher probabilities.

On the other hand, the method of generating the input procedure emphasizing the failure cause isolation is an input procedure generation method of assigning high scores to investigation items that more increase the probability of failure causes with a high probability of occurrence and more lower the probability of failure causes with a low probability of occurrence when the answers to the investigation items are obtained, thereby making it possible to reliably identify the failure cause. However, the input procedure generation method emphasizing the failure cause isolation may require a large number of investigation item answers. Therefore, it is suitable for situations or the like where the asset failure is minor and the asset owner's work is not stopped.

As a specific method of assigning a score, there is, for example, a value obtained by multiplying by −1, the sum of the average amount of information for each recommendation probability when the answers to investigation items are obtained. Assuming the number of investigation item name groups selected by the variable selection unit 1022 to be I, and the number of failure cause name groups selected by the variable selection unit 1022 to be C, and assuming each investigation item name to be an investigation item i (=1, 2, . . . , I), and each failure cause name to be a failure cause c (=1, 2, . . . , C), the score of the investigation item i is calculated by:

$$
\begin{aligned}
\text{score of investigation item } i = -1 \times \{&(\text{average amount} \\
&\text{of information on failure cause 1 when the} \\
&\text{answer to the investigation item } i \text{ is obtained})- \\
&(\text{average amount of information on failure cause} \\
&\text{2 when the answer to the investigation item } i \text{ is} \\
&\text{obtained}) - - - (\text{average amount of information} \\
&\text{on failure cause } C \text{ when the answer to the} \\
&\text{investigation item } i \text{ is obtained})\}.
\end{aligned}
$$

Since the average amount of information is a convex function that takes the minimum value when the probability of occurrence is 100% or 0%, it is multiplied by −1. Consequently, higher scores are assigned to investigation items that make higher the probability of failure causes with a relatively high probability and make lower the probability of failure causes that occur with a relatively low probability.

For the probability calculation of the present embodiment, Loopy belief propagation, Markov chain Monte Carlo methods, and the like, which are widely known as Bayesian network inference algorithms, are used. Incidentally, the input procedure generation method may be other than the failure cause identification-emphasized input procedure generation method and the failure cause isolation-emphasized input procedure generation method.

After calculating the investigation items and their scores by the input procedure generation method, the investigation items are sorted and ranked on the basis of the scores to generate the input procedure information 1R2 (FIG. 14).

As described above, the input procedure generation device 102 can generate the input procedure information for the AI engine on the basis of the KPI on which the user places importance.

Next, the input reception unit 1031 displays the name of the input procedure generation method selected by the input procedure generation method selection unit 1023 and the input procedure information 1R2 (FIG. 14) generated by the input procedure generation unit 1024 on the call center 16 via the user terminal 12, and receives the investigation item answer information 1R3 (FIG. 15) from the call center 16 via the user terminal 12 (Step 1F205).

Then, the recommendation probability calculation unit 1032 calculates the probability that the failure cause occurs when the answer to the investigation item received by the input reception unit 1031 is obtained (Step 1F206).

After that, the recommendation determination unit 1033 determines whether to make a recommendation, continuation or an end on the basis of the answers to the investigation items received by the input reception unit 1031, the probability of occurrence of each failure cause calculated by the recommendation probability calculation unit 1032, the investigation item selected by the variable selection unit 1022, the recommendation probability threshold value managed by the recommendation determination information management unit 1014, and the investigation frequency threshold value (FIG. 12) managed by the recommendation determination information management unit 1014 (Step 1F207).

When the highest probability among the probabilities of occurrence of each failure cause is equal to or higher than the recommendation probability threshold value, the recommendation decision is made. When the highest probability among the probabilities of occurrence of each failure cause is less than the recommended probability threshold value, the number of answers to the investigation items is less than the investigation frequency threshold value, and all of the investigation items selected in the variable selection unit have not been answered, the continuation determination is made. When the highest probability among the probabilities of occurrence of each failure cause is less than the recommendation probability threshold value, the number of answers to the investigation items is greater than or equal to the investigation frequency threshold value, or all of the investigation items selected in the variable selection unit have been answered, the end determination is made.

In the case of the continuation determination, the processing returns to Step 1F204. At this time, in Steps 1F204 and 1F205, the probability is calculated using the investigation item answer information 1R3 received by the input receiving unit 1031 as prior information.

After that, the recommendation result information 1R4 is created on the basis of each recommendation probability calculated in Step 1F206 and the failure cause information, and displayed on the call center 16 via the user terminal 12 together with the determination result in Step 1F207.

As described above, by adopting the configuration in which the t variables are selected on the basis of the KPIs on which the user places importance, it is possible to improve the KPIs even during input to the AI engine. Further, by generating the input procedure information that defines the input order of input variables to the AI engine, on the basis of the KPIs that the user considers important, the recommend system can be realized that can improve the KPIs all the way from the input to the output.

Incidentally, in the present embodiment, it is assumed that the next input procedure is generated again after obtaining the answer to one investigation item, but the input procedures for the answer patterns of all investigation items may be collectively calculated in advance.

<5. User Interface>

An example of a GUI (Graphical User Interface) displayed on, for example, a display device being the external output device 1H107 at the time of data input/output in the present embodiment will be described below.

Figure 19:
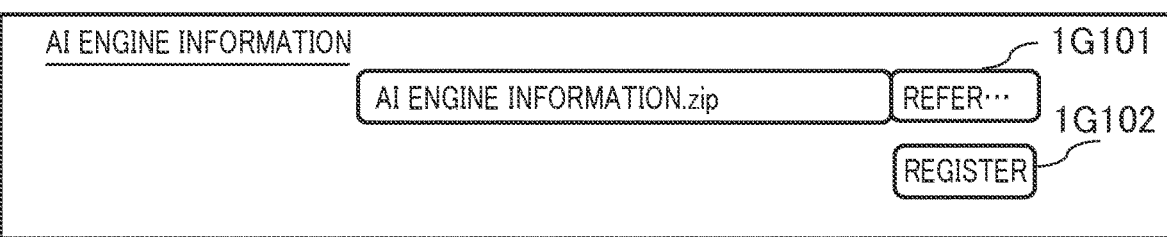
FIG. 19 is an image diagram of an AI engine information registration screen in the present embodiment.

Description will be made as to an AI engine information registration screen 1G1 of the AI engine information registration unit 1041 with reference to FIG. 19. The AI engine information registration screen 1G1 includes an AI engine information file transmission form 1G101 and a registration button 1G102. The AI engine information file transmission form 1G101 is specified by a file obtained by collecting CSV (Comma Separated Value) format files describing failure cause information, investigation item information, causal information between a failure cause and an investigation item, and probability distribution information in AI engine information. Incidentally, any format that can express the AI engine structure as shown in FIG. 4, such as a format that displays an empty table for input, may be used. The administrator 14 can transmit the input data to the AI engine information registration unit 1041 by pressing the registration button 1G102.

Figure 20:
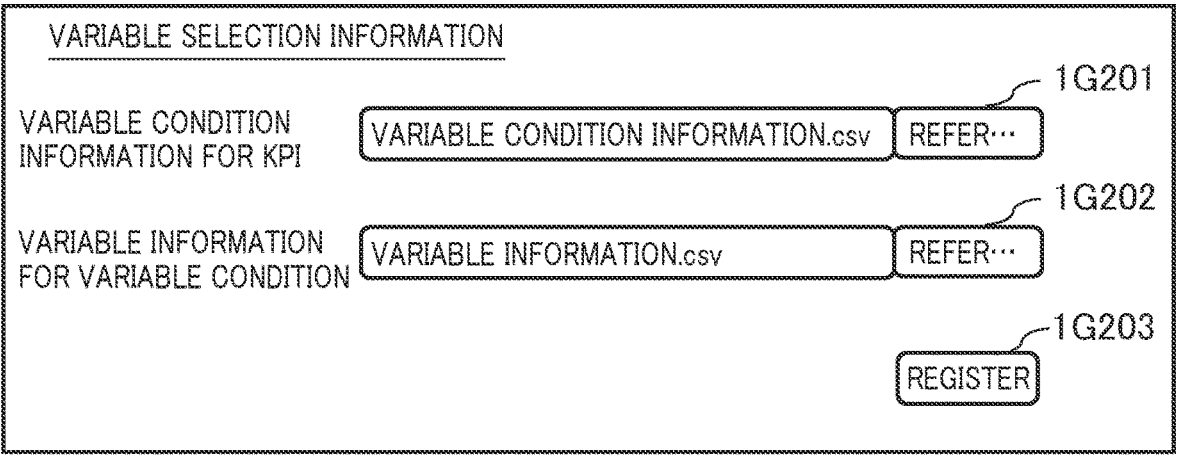
FIG. 20 is an image diagram of a variable selection information registration screen in the present embodiment.

A variable selection information registration screen 1G2 of the variable selection information registration unit 1042 will be described with reference to FIG. 20. The variable selection information registration screen 1G2 includes a variable condition information file transmission form 1G201 for the KPI, a variable information file transmission form 1G202 for variable conditions, and a registration button 1G203. In the variable condition information file transmission form 1G201 for the KPI, a CSV format file describing variable condition information for the KPI is specified. In the variable information file transmission form 1G202 for the variable conditions, a CSV format file describing variable information for the variable conditions is specified. Note that any format may be used as long as it can express the variable condition information for the KPI and the variable information for the variable conditions, as in such as a format that displays an empty table for input. The administrator can send the input data to the variable selection information registration unit 1042 by pressing the registration button 1G203.

Figure 21:
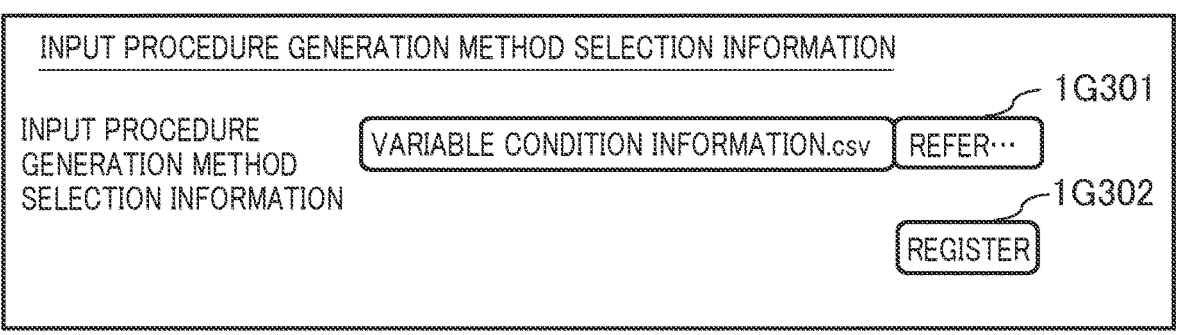
FIG. 21 is an image diagram of a registration screen for input procedure generation method selection information in the present embodiment.

An input procedure generation method selection information registration screen 1G3 of the input procedure generation method selection information registration unit 1043 will be described with reference to FIG. 21. The input procedure generation method selection information registration screen 1G3 includes an input procedure generation method selection information file transmission form 1G301 and a registration button 1G302. In the input procedure generation method selection information file transmission form 1G301, a CSV format file describing the input procedure generation method selection information is specified. Incidentally, any format that can express the input procedure generation method selection information, such as a format that displays an empty table for input, may be used. The administrator 14 can transmit the input data to the input procedure generation method selection information registration unit 1043 by pressing the registration button 1G302.

Figure 22:
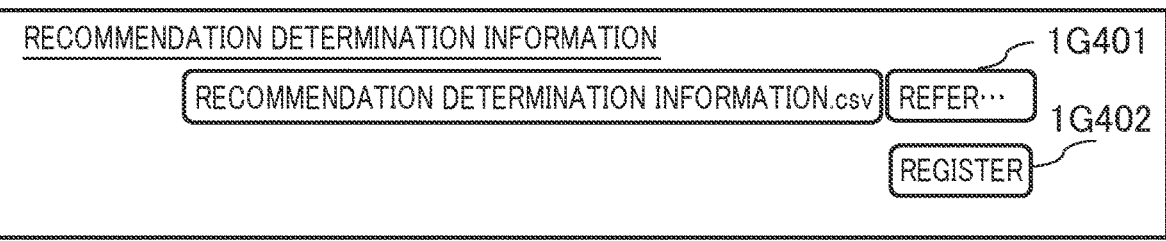
FIG. 22 is an image diagram of a recommendation determination information registration screen in the present embodiment.

A recommendation determination information registration screen 1G4 of the recommendation determination information registration unit 1044 will be described with reference to FIG. 22. The recommendation determination information registration screen 1G4 includes a recommendation determination information file transmission form 1G401 and a registration button 1G402. In the recommendation determination information file transmission form 1G401, a CSV format file that describes the recommendation determination information is specified. Note that any format may be used as long as the recommendation determination information can be expressed, such as a format in which an empty table is displayed for input. The administrator 14 can transmit the input data to the recommendation determination information registration unit 1044 by pressing the registration button 1G402.

Figure 23:
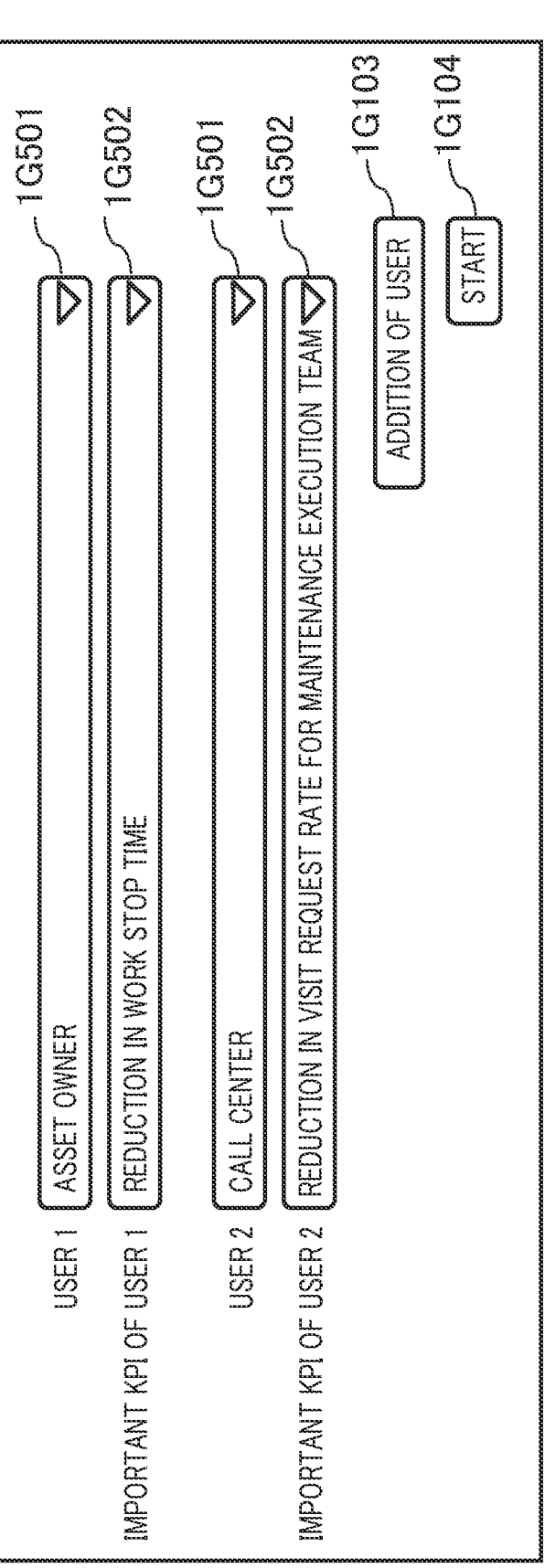
FIG. 23 is an image diagram of an important KPI reception screen in the present embodiment.

An important KPI reception screen 1G5 of the important KPI reception unit 1021 will be described with reference to FIG. 23. The important KPI reception screen 1G5 includes a user select box 1G501, an important KPI select box 1G502, an addition button 1G503, and a register button 1G504. The user select box 1G501 is input with the name of the user related to the repair of the asset. In this item, a list 1D101 of users of the variable condition information 1D1 for the KPI managed by the variable selection information management unit 1012 is displayed in a pull-down format.

The call center and the maintenance execution team select a user displayed in the pull-down format. The important KPI select box 1G502 receives the user's important KPI entered in the user select box 1G501. In this item, a list 1D102 of KPIs of the variable condition information 1D1 for the KPIs managed by the variable selection information management unit 1012 is displayed in a pull-down format. The call center and the maintenance execution team select the KPI displayed in the pull-down format.

The addition button 1G503 can increase the number of input fields when the number of users is plural. The call center and the maintenance execution team can increase the user select box 1G501 and the important KPI select box 1G502 by pressing the addition button 1G503. By pressing the registration button 1G504, the call center and the maintenance execution team can transmit the input data to the important KPI reception unit 1021.

Figure 24:
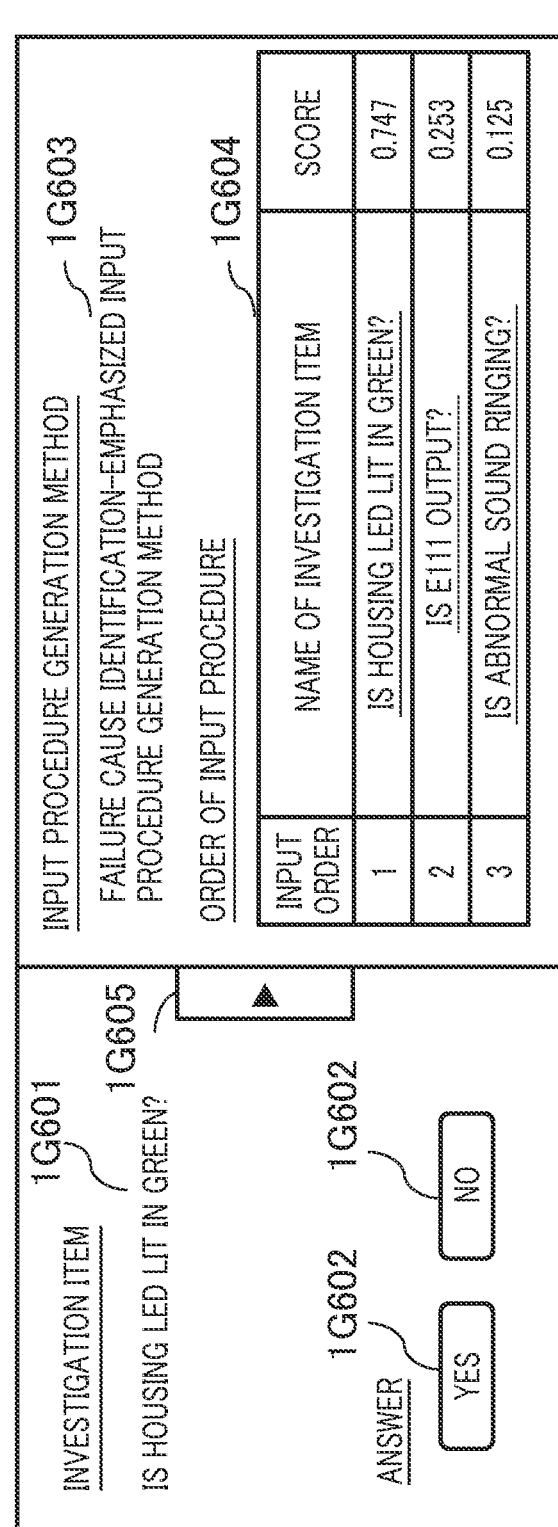
FIG. 24 is an image diagram of an input reception screen in the present embodiment.

An input reception screen 1G6 of the input reception unit 1031 will be described with reference to FIG. 24. The input reception screen 1G6 includes an investigation item name display area 1G601, an answer button 1G602, an input procedure generation method name display area 1G603, an input procedure information display area 1G604, and a supplementary information area display switching button 1G605. The investigation item name display area 1G601 displays the investigation item name with the highest input order in the input procedure information 1R2.

The call center and the maintenance execution team can transmit the investigation item answer information 1R3 to the input reception unit 1031 by pressing the answer button 1G602 with the answer described therein. The input procedure generation method name display area 1G603 displays the input procedure generation method name selected by the input procedure generation method selection unit 1023. The input procedure information display area 1G604 displays the input procedure information 1R2.

By selecting the investigation item name in the input procedure information display area 1G604, the call center and the maintenance execution team can display the investigation item name selected in the investigation item name display area 1G601 and the answer button 1G602 and select an answer.

Incidentally, in the present embodiment, the input procedure information display area 1G604 displays the top three investigation item names, but all investigation item names may be displayed. The investigation item name with the score above a predetermined value may be displayed. The call center and the maintenance execution team can display or hide the input procedure generation method name display area 1G603 and the input procedure information display area 1G604 by pressing the supplementary information area display switching button 1G605.

A recommendation result display screen 1G7 of the recommendation result display unit 1034 will be described with reference to FIG. 25. The recommendation result display screen 1G7 includes a recommendation determination display area 1G71, a recommendation result information display area 1G72, and a supplementary information display area 1G73.

The recommendation determination display area 1G71 displays recommendation or end, which is the recommendation determination of the recommendation determination unit 1033. The recommendation result information display area 1G72 displays the recommendation result information 1R4. Incidentally, in the present embodiment, the recommendation result information display area 1G72 displays the top three failure cause names, corresponding repair names, and recommendation probability, but may display all failure cause names. Alternatively, investigation item names whose recommendation probabilities exceed a predetermined value may be displayed. The supplementary information display area 1G73 displays supplementary information determined in advance regarding the contents displayed in the recommendation determination display area 1G71, supplementary information determined in advance regarding the contents displayed in the recommendation result information display area 1G72, and the like.

Here, in the field of machine learning, a devise is made about a method of when there is a data set, adding noise to the data set, further increasing the data set, etc. to improve the accuracy of the AI engine, thereby improving the KPI related to the user output. However, there is no idea from the viewpoint of generating an input procedure to the AI engine on the basis of the user's important KPI, in order for the AI engine to improve the KPI related to the user input.

As described above, according to the present embodiment, it is possible to generate the input procedure information to the AI engine on the basis of the user's important KPI.

Further, the repair recommend system using the above input procedure information can improve the user's important KPI all the way from the input to the output. In addition, the input and output can improve different important KPIs respectively.

(II) Appendix

The above embodiments include, for example, the following contents.

In each of the above-described embodiments, description has been made as to the case where the embodiment is applied to the repair recommend system, but the embodiment is not limited to this, and can be widely applied to various other systems, devices, methods, and programs.

In the embodiments described above, some or all of the programs may be installed on the computer from a program source. The program source may be, for example, a network-connected program distribution server or a computer-readable recording medium (e.g., non-transitory recording medium). Also, in the above description, two or more programs may be implemented as one program, and one program may be implemented as two or more programs.

Also, in the above-described embodiments, the configuration of each table is an example, and one table may be divided into two or more tables, or all or part of the two or more tables may be one table.

Further, the screens illustrated and described in the above-described embodiments are examples, and any design may be used as long as the information to be received is the same.

In addition, the screens illustrated and described in the above-described embodiments are examples, and any design may be used as long as the information to be recommended is the same.

Furthermore, in the above-described embodiments, the output of information is not limited to display on a display. The output of information may be audio output from a speaker, output to a file, printing on a paper medium or the like using a printing device, projection onto a screen or the like using a projector, or other aspects.

The above-described embodiment solves a new problem of taking into consideration the improvement of customer KPIs such as a failure repair time and estimation accuracy even at the input of the AI engine. According to the above embodiment, it is possible to generate the input procedure to the AI engine on the basis of the KPIs on which the user places importance, and it is possible to realize an efficient recommend system. It is therefore possible to consume less energy, reduce carbon emissions, prevent global warming, and contribute to the realization of a sustainable society.

What is claimed is:

1. An information processing device using an AI engine, comprising:
    a processor; and
    a storage section,
    wherein the processor is configured to:
    receive important KPI information designated by a user,
    select an input variable to be input to the AI engine, based on the important KPI information,
    wherein the AI engine has a cause and an item as probability variables and is represented by a network defining conditional dependency between the cause and the item,
    wherein the processor is configured to:
    store in association with each other, in the storage section, a combination of a plurality of input conditions and a plurality of input procedure generation methods which are rules for ordering the items,
    specify the plurality input conditions associated with the important KPI information,
    specify a plurality of the items associated with the priority KPI information,
    select the input procedure generation method based on the input conditions,
    generate input procedure information for determining an order of the specified items based on the input procedure generation method,
    transmit the input procedure information via an external terminal,
    receive an item corresponding to the transmission and an answer to the item via the external terminal, and
    calculate a probability of an output variable that is the cause using the AI engine with the item and the answer to the item as input variables of the AI engine.

2. The information processing device according to claim 1,
    wherein the processor is configured to specify a plurality of the items linked to the input, condition.

3. The information processing device according to claim 2,
    wherein the processor is configured to select, as the input procedure generation method one of:
    a cause identification-emphasized input procedure generation method of assigning a high score to an item which more increases the probability of a high-probability cause when an input corresponding to the item is obtained, and
    a cause isolation-emphasized input procedure generation method of assigning a high score to an item which more increases the probability of relatively high-probability causes and more decreases the probability of relatively low-probability causes when an input corresponding to the item is obtained.

4. The information processing device according to claim 2,
    wherein the processor is configured to generate input procedure information indicating the order of the input variables, based on the input procedure generation method.

5. The information processing device according to claim 1,
    wherein the processor is configured to:
    specify an output condition linked to the important KPI information,
    specify the cause linked to the output condition, and
    set information corresponding to the cause as an output variable output from the AI engine.

6. The information processing device according to claim 1,
    wherein an important KPI information is designated for each of a plurality of user.

7. An input control method of performing an input from an information processing device to an AI engine having a cause and an item as probability variables and represented by a network defining conditional dependency between the cause and the item, which executes steps comprising:
    important KPI reception processing of receiving important KPI information designated by a user;
    variable selection processing of selecting an input variable to be input to the AI engine, based on the important KPI information;
    storing in association with each other, in the storage section, a combination of a plurality of input conditions and a plurality of input procedure generation methods which are rules for ordering the items;
    specifying the plurality input conditions associated with the important KPI information;
    specifying a plurality of the items associated with the priority KPI information;
    selecting the input procedure generation method based on the input conditions;
    generating input procedure information for determining an order of the specified items based on the input procedure generation method;
    transmitting the input procedure information via an external terminal;
    receiving an item corresponding to the transmission and an answer to the item via the external terminal; and
    calculating a probability of an output variable that is the cause using the AI engine with the item and the answer to the item as input variables of the AI engine.

8. The input control method according to claim 7,
    wherein the processor is configured to select, as the input procedure generation method one of:
    a cause identification-emphasized input procedure generation method of assigning a high score to an item which more increases the probability of a high-probability cause when an input corresponding to the item is obtained, and
    a cause isolation-emphasized input procedure generation method of assigning a high score to an item which more increases the probability of relatively high-probability causes and more decreases the probability of relatively low-probability causes when an input corresponding to the item is obtained.

9. The input control method according to claim 7,
    wherein an important KPI information is designated for each of a plurality of users.

10. A non-transitory computer readable medium with an executable program stored thereon to cause an information processing device to perform an input from the information processing device to an AI engine having a cause and an item as probability variables and represented by a network defining conditional dependency between the cause and the item, and to further cause the information processing device to execute steps comprising:

important KPI reception processing of receiving important KPI information designated by a user;

variable selection processing of selecting an input variable to be input to the AI engine, based on the important KPI information;

storing in association with each other, in the storage section, a combination of a plurality of input conditions and a plurality of input procedure generation methods which are rules for ordering the items;

specifying the plurality input conditions associated with the important KPI information;

specifying a plurality of the items associated with the priority KPI information;

selecting the input procedure generation method based on the input conditions;

generating input procedure information for determining an order of the specified items based on the input procedure generation method;

transmitting the input procedure information via an external terminal;

receiving an item corresponding to the transmission and an answer to the item via the external terminal; and calculating a probability of an output variable that is the cause using the AI engine with the item and the answer to the item as input variables of the AI engine.

* * * * *